United States Patent
Zhou et al.

(10) Patent No.: US 11,232,116 B2
(45) Date of Patent: Jan. 25, 2022

(54) METHOD, COMPUTER DEVICE AND STORAGE MEDIUM FOR MINING POINT OF INTEREST COMPETITIVE RELATIONSHIP

(71) Applicant: BAIDU ONLINE NETWORK TECHNOLOGY (BEIJING) CO., LTD., Beijing (CN)

(72) Inventors: Jingbo Zhou, Beijing (CN); Jianguo Duan, Beijing (CN); Airong Jiang, Beijing (CN); Hui Xiong, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 471 days.

(21) Appl. No.: 16/443,633

(22) Filed: Jun. 17, 2019

(65) Prior Publication Data
US 2020/0065302 A1 Feb. 27, 2020

(30) Foreign Application Priority Data
Aug. 27, 2018 (CN) .......................... 201810981108.1

(51) Int. Cl.
*G06F 16/2458* (2019.01)
*G06N 20/00* (2019.01)
*G06F 16/29* (2019.01)

(52) U.S. Cl.
CPC .......... *G06F 16/2465* (2019.01); *G06F 16/29* (2019.01); *G06N 20/00* (2019.01)

(58) Field of Classification Search
CPC ...... G06F 16/2465; G06F 16/29; G06N 20/00
See application file for complete search history.

(56) References Cited

U.S. PATENT DOCUMENTS

| | | | |
|---|---|---|---|
| 10,643,227 B1* | 5/2020 | Gupta | G06Q 30/0204 |
| 2014/0129293 A1* | 5/2014 | Chang | G06Q 30/0205 |
| | | | 705/7.34 |

FOREIGN PATENT DOCUMENTS

| | | |
|---|---|---|
| CN | 104123318 A | 10/2014 |
| CN | 106294338 A | 1/2017 |
| CN | 106844402 A | 6/2017 |

(Continued)

OTHER PUBLICATIONS

Third Office Action and Search Report from CN app. No. 201810981108.1, dated Aug. 30, 2021, with machine English translation from Google Translate.

(Continued)

*Primary Examiner* — Etienne P Leroux
*Assistant Examiner* — Husam Turki Samara
(74) *Attorney, Agent, or Firm* — Ladas & Parry, LLP (57) ABSTRACT

A method, computer device and storage medium for mining a point of interest competitive relationship are disclosed. The method includes: for a first POI to be processed, obtaining a set of second POIs serving as mining objects of the first POI; for each second POI in the set, forming a POI pair with the second POI and the first POI, determining a relationship evaluation index of the POI pair according to user's search operations on a map for POIs, and judging whether the two POIs in the POI pair are in a competitive relationship according to the relationship evaluation index. The technical solution of the present disclosure may be applied to improve the accuracy of the processing results.

10 Claims, 3 Drawing Sheets

(56) References Cited

FOREIGN PATENT DOCUMENTS

| CN | 107169005 A | 9/2017 |
|----|-------------|--------|
| CN | 107609185 A | 1/2018 |
| CN | 107679189 A | 2/2018 |
| CN | 108205766 A | 6/2018 |
| CN | 108228593 A | 6/2018 |
| TW | 201828244 A | 8/2018 |

OTHER PUBLICATIONS

First Office Action from CN app. No. 201810981108.1, dated May 13, 2019, with machine English translation from Google Translate.
Second Office Action from CN app. No. 201810981108.1, dated Jul. 22, 2019, with machine English translation from Google Translate.

\* cited by examiner

METHOD, COMPUTER DEVICE AND STORAGE MEDIUM FOR MINING POINT OF INTEREST COMPETITIVE RELATIONSHIP

CROSS REFERENCE TO RELATED APPLICATIONS

The present application claims the priority to Chinese Patent Application No. 201810981108.1, filed on Aug. 27, 2018, with the title of "Method, apparatus, computer device and storage medium for mining point of interest competitive relationship". The disclosure of the above application is incorporated herein by reference in its entirety.

TECHNICAL FIELD

The present disclosure relates to computer application technologies, and particularly to a method, computer device and storage medium for mining a point of interest competitive relationship.

BACKGROUND

In an urban region, Points of Interests (POIs) are an important part of the vitality of the region. POIs may include retail stores, restaurants, entertainment venues and the like.

POI competitive relationship analysis refers to how to effectively measure the competitive relationship between a POI and surrounding POIs. The competitive relationship of POIs is mainly reflected by the attraction of customers in the region. Analysis of the POI competitive relationship is of great significance for POI operators such as the owner of a restaurant or a manager of an entertainment venue. For example, the analysis of the POI competitive relationship may help POI operators conduct research on site selection, help operators arrange marketing activities purposefully, and help operators set reasonable price strategies.

The current POI competitive relationship analysis is still in a relatively preliminary stage. The POI competitive relationship is usually analyzed by using experience in combination with manual information collection, including questionnaire survey, in-store survey and experience accumulation.

Analyzing the POI competitive relationship based on experience has very apparent shortcoming because relatively larger deviations exist between the traditional experience and real competitive relationship and therefore causes an undesirable accuracy. Comparatively speaking, analyzing the POI competitive relationship based on manual information collection exhibits a higher accuracy, but this requires consumption of larger manpower costs and the efficiency is lower because the information needs to be manually collected.

SUMMARY

In view of the above, embodiments of the present disclosure propose a method, an apparatus, a computer device and a storage medium for mining a point of interest competitive relationship.

Specific technical solutions are as follows:

According to an embodiment, a method for mining a point of interest (POI) competitive relationship may include:

for a first POI to be processed, obtaining a set of second POIs serving as mining objects of the first POI; and for each second POI in the set, forming a POI pair with the second POI and the first POI, determining a relationship evaluation indexes of the POI pair according to user's search operations on a map for POIs, and judging whether the two POIs in the POI pair are in a competitive relationship according to the relationship evaluation index.

According to an embodiment, the obtaining a set of second POIs serving as mining objects of the first POI may include:

selecting, according to a predetermined rule, second POIs similar to the first POI from the POIs on the map recorded in a database, and obtaining the set of second POIs.

According to an embodiment, the predetermined rule may include at least one of:

a second POI belongs to a same category as the first POI; and a distance between a second POI and the first POI is less than a preset first threshold.

According to an embodiment, the determining the relationship evaluation index of the POI pair may include:

counting times of occurrence of a first case in a most recent preset time period, the first case including: the same user sequentially searches for the first POI and the second POI on the map, and a time interval of the two search actions is less than a preset second threshold;

counting times of occurrence of a second case in a most recent preset time period, the second case including: a same user sequentially searches for the second POI and the first POI on the map, and a time interval of the two search actions is less than the second threshold; and taking two counting results as the relationship evaluation index of the POI pair.

According to an embodiment, the judging whether the two POIs in the POI pair are in a competitive relationship according to the relationship evaluation index may include:

under the condition that the two counting results are both greater than a preset third threshold, determining that the two POIs in the POI pair are in the competitive relationship.

According to an embodiment, the judging whether the two POIs in the POI pair are in a competitive relationship according to the relationship evaluation indexes may include:

taking the relationship evaluation index at least as a feature of the POI pair, inputting the feature of the POI pair into a machine learning model obtained by pre-training to obtain a competitive relationship score of the POI pair; and judging whether the two POIs in the POI pair are in the competitive relationship according to the competitive relationship score.

According to an embodiment, the judging whether the two POIs in the POI pair are in the competitive relationship according to the competitive relationship score may include:

comparing the competitive relationship score with a preset fourth threshold, and under the condition that the competitive relationship score is greater than the fourth threshold, determining that the two POIs in the POI pair are in the competitive relationship; or after respectively obtaining the competitive relationship scores of the POI pairs in which each second POI in the set of second POIs lies, sorting the competitive relationship scores in a descending order, and under the condition that a competitive relationship score of any POI pair ranks at top K, determining that the two POIs in said any POI pair are in the competitive relationship, K being a positive integer and smaller than the number of the second POIs in the set of second POIs.

According to an embodiment, the training to obtain the machine learning model may include:

obtaining a POI pair as a positive sample and a POI pair as a negative sample, the two POIs in the POI pair as the positive sample are in the competitive relationship, and the two POIs in the POI pair as the negative sample are not in the competitive relationship;

obtaining a feature of the POI pair as the positive sample and a feature of the POI pair as the negative sample, the features obtained each at least including a relationship evaluation index; and based on the features obtained, obtaining the machine learning model by training based on the positive sample and the negative sample.

According to an embodiment, an apparatus for mining a point of interest (POI) competitive relationship may include;

an obtaining unit configured to, for a first POI to be processed, obtain a set of second POIs serving as mining objects of the first POI; and a mining unit configured to, for each second POI in the set, form a POI pair with the second POI and the first POI, determine a relationship evaluation index of the POI pair according to user's search operations on a map for POIs, and judge whether the two POIs in the POI pair are in a competitive relationship according to the relationship evaluation index.

According to an embodiment, the obtaining unit may select, according to a predetermined rule, second POIs similar to the first POI from the POIs on the map recorded in a database, and obtain the set of second POIs.

According to an embodiment, the predetermined rule may include at least one of:

a second POI belongs to a same category as the first POI; and a distance between a second POI and the first POI is less than a preset first threshold.

According to an embodiment, the mining unit determines the relationship evaluation index of the POI pair in the following manner:

counting times of occurrence of a first case in a most recent preset time period, the first case including: a same user sequentially searches for the first POI and the second POI on the map, and a time interval of the two search actions is less than a preset second threshold;

counting times of occurrence of a second case in a most recent preset time period, the second case including: a same user sequentially searches for the second POI and the first POI on the map, and a time interval of the two search actions is less than the second threshold;

taking two counting results as the relationship evaluation index of the POI pair.

According to an embodiment, under the condition that the two counting results are both greater than a preset third threshold, the mining unit determines that the two POIs in the POI pair are in the competitive relationship.

According to an embodiment, the mining unit may take the relationship evaluation index at least as a feature of the POI pair, inputs the feature of the POI pair into a machine learning model obtained by pre-training to obtain the competitive relationship score of the POI pair, and then judges whether the two POIs in the POI pair are in the competitive relationship according to the competitive relationship score.

According to an embodiment, the mining unit compares the competitive relationship score with a preset fourth threshold, and under the condition that the competitive relationship score is greater than the fourth threshold, determines that the two POIs in the POI pair are in the competitive relationship; or after respectively obtaining the competitive relationship scores of the POI pairs in which each second POI in the set of second POIs lies, the mining unit sorts the competitive relationship scores in a descending order, and under the condition that the competitive relationship score of any POI pair ranks at top K, determines that the two POIs in the POI pair are in the competitive relationship, K being a positive integer and smaller than the number of the second POIs in the set of second POIs.

According to an embodiment, the apparatus may further include: a model training unit;

the model training unit is configured to obtain a POI pair as a positive sample and a POI pair as a negative sample, the two POIs in the POI pair as the positive sample are in the competitive relationship, and the two POIs in the POI pair as the negative sample are not in the competitive relationship; obtain a feature of the POI pair as the positive sample and a feature of the POI pair as the negative sample, the features obtained each at least including a relationship evaluation index; based on the features obtained, obtain the machine learning model by training based on the positive sample and the negative sample.

According to an embodiment, it is proposed a computer device including a memory, a processor and a computer program which is stored on the memory and runs on the processor, the processor, upon executing the program, implements the above-mentioned method.

According to an embodiment, it is proposed a computer-readable storage medium on which a computer program is stored, the program, when executed by the processor, implements the aforesaid method.

As may be seen from the above introduction, according to the solution of the present disclosure, it is possible to determine the relationship evaluation index of two POIs directly according to the user's search operation on the map for the POI without relying on experience, and then judge whether two POIs are in the competitive relationship according to the relationship evaluation index, and thereby improve the accuracy of the processing result. Furthermore, manual operation may not be needed, so that the manpower costs may be saved and the processing efficiency may be improved.

DETAILED DESCRIPTION

Technical solutions of the present disclosure will be described in more detail in conjunction with figures and embodiments to make technical solutions of the present disclosure clear and more apparent.

It is apparent that the described embodiments are partial embodiments of the present disclosure, not all embodiments. Based on embodiments in the present disclosure, all other embodiments obtained by those having ordinary skill in the art without making inventive efforts all fall within the protection scope of the present disclosure.

Figure 1:
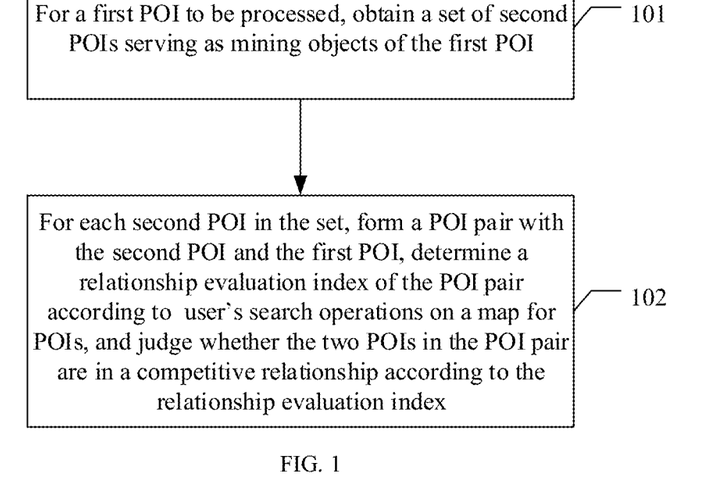
FIG. 1 is a flowchart illustrating a method for mining a point of interest competitive relationship according to an embodiment of the present disclosure.

FIG. 1 is a flowchart illustrating a method for mining a point of interest competitive relationship according to an embodiment of the present disclosure. As shown in FIG. 1, the embodiment may include the following specific implementations.

In 101, for a first POI to be processed, obtaining a set of second POIs serving as mining objects of the first POI.

In 102, for each second POI in the set, forming a POI pair with the second POI and the first POI, determining a relationship evaluation index of the POI pair according to user's search operations on a map for POIs, and judging whether the two POIs in the POI pair are in a competitive relationship according to the relationship evaluation index.

When it is necessary to mine a POI in the competitive relationship with any POI, a set of POIs as the mining objects of the any POI may be first obtained. To facilitate a differentiation, the "any POI" is referred to as a first POI, and the POI which is in the set and serves as the mining object of the first POI is referred to as a second POI.

The set of second POIs may include all POIs on the map recorded in a database, or, in order to reduce the amount of data to be processed subsequently, it is feasible to perform pre-filtering processing, that is, select, according to a predetermined rule, second POIs similar to the first POI from the POIs on the map recorded in the database, and thereby obtain the set of second POIs.

The predetermined rule may be specifically determined according to actual needs, for example, may include at least one of the following: a second POI belongs to the same category as the first POI, and a distance between the second POI and the first POI is less than a preset first threshold.

Belonging to the same category may include belonging to a category of restaurants or belonging to a category of entertainment venues. Alternatively, the category may be further refined, for example, a hot pot restaurant may be regarded as a category, and a fast food restaurant may be regarded as a category, and the like. The specific value of the first threshold may be determined according to actual needs, for example 2 kilometers, that is, the distance between the second POI and the first POI needs to be less than 2 kilometers. Assuming that the first POI belongs to the restaurant category, obtaining the set of second POIs as the mining objects of the first POI may include obtaining a set of the second POIs that are within a range of 2 km away from the first POI and belong to the restaurant category.

Then, it is possible to, for each second POI in the set, form a POI pair with the second POI and the first POI, determine a relationship evaluation index of the POI pair according to the user's search operations on the map for POIs, and judge whether the two POIs in the POI pair are in a competitive relationship according to the relationship evaluation index.

Herein, determining the relationship evaluation index of the POI pair may include:

counting times co-map1 of occurrence of a first case in a most recent preset time period, the first case including: the same user sequentially searches for the first POI and the second POI on the map, and a time interval of the two search actions is less than a preset second threshold;

counting times co-map2 of occurrence of a second case in a most recent preset time period, the second case including: the same user sequentially searches for the second POI and the first POI on the map, and a time interval of the two search actions is less than the second threshold;

taking the two counting results co-map1 and co-map2 as the relationship evaluation index of the POI pair.

The specific values of the most recent preset time period and the second threshold may be determined according to actual needs.

For example, under the condition that a total of 500 users searched for the first POI and the second POI sequentially in a time interval of less than 30 minutes in the recent month, the value of co-map1 is 500; under the condition that a total of 600 users searched for the second POI and the first POI sequentially in a time interval of less than 30 minutes in the recent month, the value of co-map2 is 600.

Sequentially searching for the first POI and the second POI may include searching for the first POI first, and then searching for the second POI; sequentially searching for the second POI and the first POI may include searching for the second POI first, and then searching for the first POI.

After the relationship evaluation index of the POI pair is determined, the two counting results in the relationship evaluation index may be respectively compared with a preset third threshold. Under the condition that the two counting results are both greater than the third threshold, it may be determined that the two POIs in the POI pair are in the competitive relationship. The specific value of the third threshold may be determined according to actual needs. For example, under the condition that co-map1 is greater than the third threshold, and co-map2 is greater than the third threshold, it may be determined that the two POIs in the POI pair are in the competitive relationship.

Figure 2:
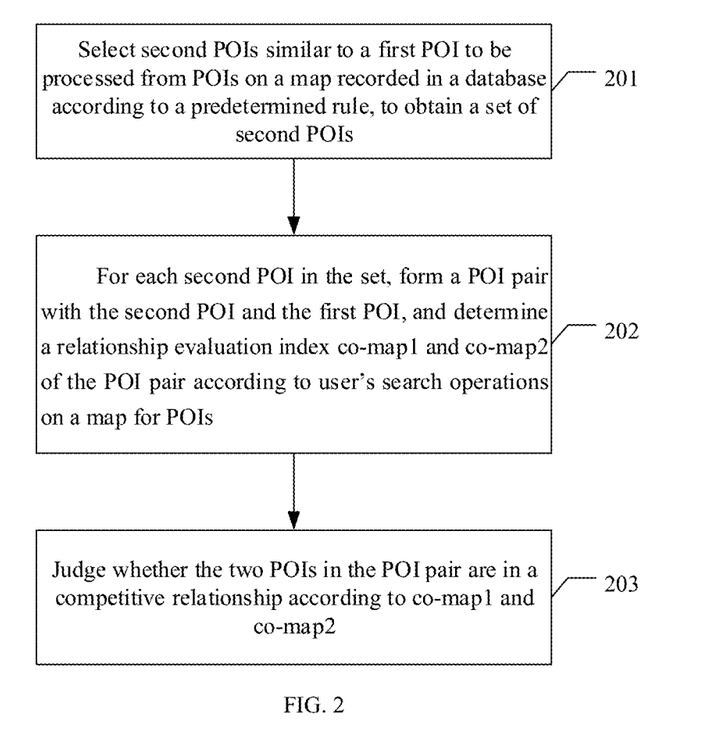
FIG. 2 is a flow chart illustrating a method for mining a POI competitive relationship based on a rule according to an embodiment of the present disclosure.

The method for mining a POI competitive relationship described above is based on a rule. As described above, FIG. 2 is a flow chart illustrating a method for mining a POI competitive relationship based on a rule according to of an embodiment the present disclosure. As shown in FIG. 2, the embodiment may include the following specific implementations.

In 201, selecting second POIs similar to a first POI to be processed from POIs on the map recorded in a database according to a predetermined rule, to obtain a set of second POIs.

For example, the second POIs belong to the same category as the first POI, and a distance between each of the second POIs and the first POI is less than a first threshold.

In 202, for each second POI in the set, forming a POI pair with the second POI and the first POI, and determine relationship evaluation index, such as co-map1 and co-map2, of the POI pair according to the user's search operation on the map for POIs.

The co-map1 is the counted times of occurrence of a first case in a most recent preset time period, and the first case includes: the same user sequentially searches for the first POI and the second POI on the map, and a time interval of the two search actions is less than a second threshold.

The co-map2 is the counted times of occurrence of a second case in a most recent preset time period, and the second case includes: the same user sequentially searches for the second POI and the first POI on the map, and a time interval of the two search actions is less than the second threshold.

In 203, it is judged whether the two POIs in the POI pair are in the competitive relationship according to co-map1 and co-map2.

For example, under the condition that both co-map1 and co-map2 are greater than a third threshold, it may be determined that the two POIs in the POI pair are in the competitive relationship.

In addition to the method for mining a POI competitive relationship based on a rule, in an embodiment, a method for mining a POI competitive relationship based on machine learning is also proposed.

Similarly, in order to reduce the amount of data to be processed subsequently, it is feasible to select, according to a predetermined rule, second POIs similar to the first POI from the POIs on the map recorded in the database, and thereby obtain the set of second POIs.

It is possible to, for each second POI in the set, form a POI pair with the second POI and the first POI, and determine a relationship evaluation index of the POI pair according to the user's search operation on the map for the POI.

After that, the relationship evaluation index may be regarded at least as a feature of the POI pair, and input into a machine learning model obtained by pre-training to obtain a competitive relationship score of the POI pair, and then whether the two POIs in the POI pair are in the competitive relationship is judged according to the competitive relationship score.

To obtain the machine learning model by training, it may be required to obtain a POI pair as a positive sample and a POI pair as a negative sample, respectively, where the two POIs in the POI pair as the positive sample are in the competitive relationship, and the two POIs in the POI pair as the negative sample are not in the competitive relationship; respectively obtain a feature of the POI pair as the positive sample and a feature of the POI pair as the negative sample, and the features obtained each at least includes a relationship evaluation index; based on the obtained features, obtain the machine learning model by training based on the positive sample and the negative sample.

Figure 3:
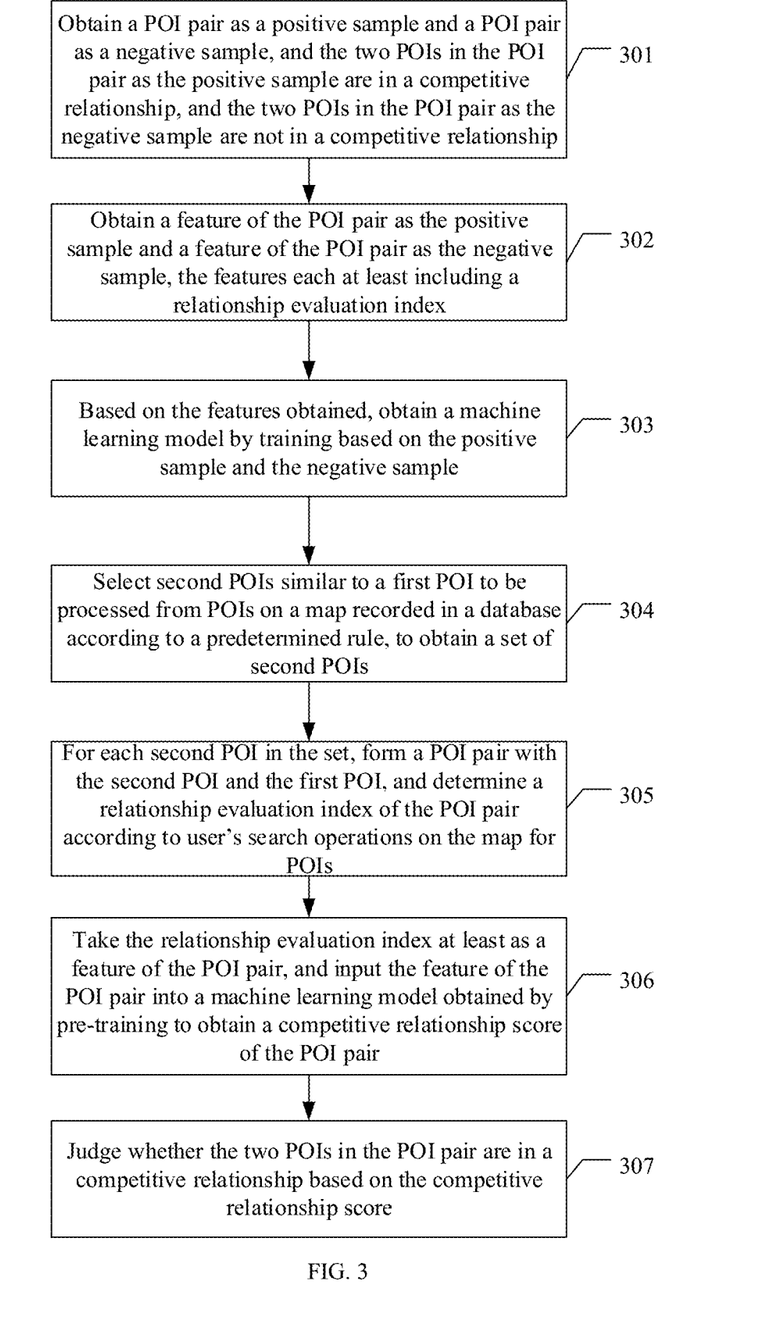
FIG. 3 is a flowchart illustrating a method for mining a POI competitive relationship based on machine learning according to an embodiment of the present disclosure.

Based on the above description, FIG. 3 is a flowchart illustrating a method for mining a POI competitive relationship based on machine learning according to an embodiment of the present disclosure. As shown in FIG. 3, the embodiment may include the following specific implementations.

In 301, POI pairs are obtained as a positive sample or a negative sample, respectively, where the two POIs in the POI pair as the positive sample are in a competitive relationship, and the two POIs in the POI pair as the negative sample are not in a competitive relationship.

The desired positive sample and negative sample may be constructed. The positive sample may be constructed based on existing POI competitive relationship database, or manually constructed based on the knowledge in the field. For example, the competitive relationship between POIs such as KFC and McDonald's is obvious and may be manually annotated. The negative sample may also be constructed manually based on the knowledge in the field. For example, Li Ning Sports Brand Store and KFC may be regarded as being not in a competitive relationship.

In 302, a feature of a POI pair as the positive sample or the negative sample is respectively obtained, and the feature at least include: a relationship evaluation index.

As mentioned above, the relationship evaluation index may include co-map1 and co-map2.

The co-map1 is the counted times of occurrence of a first case in a most recent preset time period, and the first case includes: the same user sequentially searches for the first POI and the second POI on the map, and a time interval of the two search actions is less than a second threshold.

The co-map2 is the counted times of occurrence of a second case in a most recent preset time period, and the second case includes: the same user sequentially searches for the second POI and the first POI on the map, and a time interval of the two search actions is less than the second threshold.

In 303, based on the obtained features, a machine learning model is obtained by training based on the positive sample and the negative sample.

The purpose of training is that given any two POIs, the machine learning model may be used to give a value for measuring the degree of competition between two POIs, namely, a competitive relationship score.

The machine learning model may be any form of model supporting machine learning, such as Support Vector Machine (SVM) model, Decision Tree Model, Gradient Boosting Trees (GBT) model or neural network model.

In 304, select second POIs similar to a first POI to be processed from POIs on the map recorded in a database according to a predetermined rule, to obtain a set of second POIs.

For example, the second POI belongs to the same category as the first POI, and a distance between the second POI and the first POI is less than a first threshold.

In 305, for each second POI in the set, form a POI pair with the second POI and the first POI, and determine a relationship evaluation index of the POI pair according to user's search operation on a map for POIs.

For example, co-map1 and co-map2 of the POI pair are determined.

In 306, the relationship evaluation index is regarded at least as a feature of the POI pair, and input into a machine learning model obtained by pre-training to obtain a competitive relationship score of the POI pair.

Under the condition that only the relationship evaluation index is included in the feature of the POI pair as the positive sample or the negative sample obtained in 302, only the relationship evaluation index is input into the machine learning model as a feature of the POI pair in 306.

In practical application, in addition to the relationship evaluation index, the feature of the POI pair as the positive sample and the feature of the POI pair as the negative sample may further each include some other features, such as a category to which the two POIs in the POI pair belong and a distance between the two POIs in the POI pair. Then, correspondingly, in 306, in addition to inputting the relationship evaluation index as a feature of the POI pair into the machine learning model, it is necessary to obtain features such as the category to which the two POIs in the POI pair belong and the distance between the two POIs in the POI pair, and input such features together with the relationship evaluation index into the machine learning model.

In 307, it is judged whether the two POIs in the POI pair are in a competitive relationship based on the competitive relationship score.

For example, the competitive relationship score may be compared with a preset fourth threshold. Under the condition that the competitive relationship score is greater than the fourth threshold, it may be determined that the two POIs in the POI pair are in a competitive relationship.

Alternatively, it is feasible to, after respectively obtaining the competitive relationship score of the POI pair in which each second POI in the set of second POIs lies, sort the competitive relationship scores in a descending order, and under the condition that the competitive relationship score of a certain POI pair ranks at top K, determine that the two POIs in the POI pair are in a competitive relationship, wherein K is a positive integer and is smaller than the number of the second POIs in the set of second POIs, that is, return the second POIs in the K POI pairs with the highest competitive relationship scores as the POIs in the competitive relationship with the first POI.

As appreciated, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description are only examples, and the involved actions and modules may not essential for the present disclosure.

In the above embodiments, different emphasis is placed on respective embodiments, and reference may be made to related depictions in other embodiments for portions not detailed in a certain embodiment.

To sum up, according to the technical solution disclosed in an method embodiment of the present disclosure, it is possible to determine the relationship evaluation index of two POIs directly according to user's search operations on the map for POIs without relying on experience, and then judge whether two POIs are in a competitive relationship according to the relationship evaluation index, and thereby improve the accuracy of the processing result. Furthermore, manual operation is not needed, so that the manpower costs are saved and the processing efficiency is improved.

The above introduces the method embodiment. The technical solution of the present disclosure will be further described through an apparatus embodiment.

Figure 4:
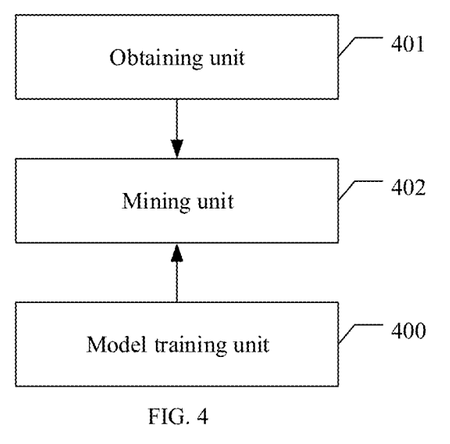
FIG. 4 is a schematic structural diagram of an apparatus for mining a POI competitive relationship according to an embodiment of the present disclosure.

FIG. 4 is a schematic structural diagram of an apparatus for mining a POI competitive relationship according to an embodiment of the present disclosure. As shown in FIG. 4, the apparatus may include: an obtaining unit 401 and a mining unit 402.

The obtaining unit 401 is configured to, for a first POI to be processed, obtain a set of second POIs serving as mining objects of the first POI.

The mining unit 402 is configured to, for each second POI in the set, form a POI pair with the second POI and the first POI, determine a relationship evaluation index of the POI pair according to the user's search operations on the map for the POIs, and judge whether the two POIs in the POI pair are in a competitive relationship according to the relationship evaluation index.

When it is necessary to mine a POI in the competitive relationship with any POI, a set of POIs as the mining objects of the any POI may be first obtained. To facilitate differentiation, the "any POI" is referred to as a first POI, and the POI which is in the set and serves as the mining object of the first POI is referred to as a second POI.

The set of second POIs may include all POIs on the map recorded in a database, or, in order to reduce the amount of data to be processed subsequently, it is feasible to perform pre-filtering processing, that is, the obtaining unit 401 may select, according to a predetermined rule, second POIs similar to the first POI from the POIs on the map recorded in the database, and thereby obtain the set of second POIs.

The predetermined rule may be specifically determined according to actual needs, for example, may include one or all of the following: the second POI belongs to the same category as the first POI, and a distance between the second POI and the first POI is less than a preset first threshold.

The mining unit 402 may, for each second POI in the set, form a POI pair with the second POI and the first POI, determine a relationship evaluation index of the POI pair according to the user's search operations on the map for POIs, and then judge whether the two POIs in the POI pair are in a competitive relationship according to the relationship evaluation index.

Wherein, determining the relationship evaluation index of the POI pair may include:

counting times co-map1 of occurrence of a first case in a most recent preset time period, the first case including: the same user sequentially searches for the first POI and the second POI on the map, and a time interval of the two search actions is less than a preset second threshold;

counting times co-map2 of occurrence of a second case in a most recent preset time period, the second case including: the same user sequentially searches for the second POI and the first POI on the map, and a time interval of the two search actions is less than the second threshold;

taking the two counting results co-map1 and co-map2 as the relationship evaluation index of the POI pair.

After the relationship evaluation index of the POI pair is determined, the mining unit 402 compares the two counting results in the relationship evaluation index with a preset third threshold. Under the condition that the two counting results are both greater than the third threshold, it may be determined that the two POIs in the POI pair are in the competitive relationship. For example, under the condition that co-map1 is greater than the third threshold, and co-map2 is greater than the third threshold, it may be determined that the two POIs in the POI pair are in the competitive relationship.

The method for mining a POI competitive relationship described above is based on a rule. In addition, a method for mining a POI competitive relationship based on machine learning is also proposed in an embodiment of the present disclosure.

The mining unit 402, after determining the relationship evaluation index of the POI pair, regards the relationship evaluation index at least as a feature of the POI pair, inputs the feature of the POI pair into a machine learning model obtained by pre-training to obtain a competitive relationship score of the POI pair, and then judges whether the two POIs in the POI pair are in the competitive relationship according to the competitive relationship score.

Correspondingly, the apparatus shown in FIG. 4 may further include a model training unit 400.

The model training unit 400 is configured to obtain a POI pair as a positive sample and a POI pair as a negative sample, where the two POIs in the POI pair as the positive sample are in a competitive relationship, and the two POIs in the POI pair as the negative sample are not in a competitive relationship; obtain a feature of the POI pair as the positive sample and a feature of the POI pair as the negative sample, the features obtained each at least including a relationship evaluation index; based on the features obtained, obtain a machine learning model by training based on the positive sample and the negative sample.

The purpose of training is that given any two POIs, the machine learning model may be used to give a value for measuring the degree of competition between two POIs, namely, a competitive relationship score.

The machine learning model may be any form of model supporting machine learning, such as SVM model, Decision Tree Model, Gradient Boosting Trees (GBT) model or neural network model.

In the model training phase, under the condition that only a relationship evaluation index is included in the feature of the POI pair as the positive sample and the feature of the POI pair as the negative sample, the mining unit 402, after determining the relationship evaluation index of the POI pair, is configured to input only the relationship evaluation index into the machine learning model as a feature of the POI pair.

In practical application, in addition to the relationship evaluation index, the obtained feature of the POI pair as the positive sample and the feature of the POI pair as the negative sample may each further include some other features, such as a category to which the two POIs in the POI pair belong and a distance between the two POIs in the POI pair. Then, correspondingly, the mining unit 402, in addition to inputting the relationship evaluation index as a feature of the POI pair into the machine learning model, further needs to obtain features such as the category to which the two POIs in the POI pair belong and the distance between the two POIs in the POI pair, and input such features together with the relationship evaluation index into the machine learning model.

After obtaining the competitive relationship score of the POI, the mining unit 402 may judge whether the two POIs in the POI pair are in a competitive relationship based on the competitive relationship score.

For example, the mining unit 402 may compare the competitive relationship score with a preset fourth threshold, and under the condition that the competitive relationship score is greater than the fourth threshold, determine that the two POIs in the POI pair are in a competitive relationship.

Alternatively, the mining unit 402 is configured to, after respectively obtaining the competitive relationship score of the POI pair in which each second POI in the set of second POIs lies, sort the competitive relationship scores in a descending order, and under the condition that the competitive relationship score of a certain POI pair ranks at top K, determine that the two POIs in the POI pair are in a competitive relationship, wherein K is a positive integer and is smaller than the number of the second POIs in the set of second POIs, that is, return the second POIs in the K POI pairs with the highest competitive relationship scores as the POIs in the competitive relationship with the first POI.

Reference may be made to corresponding depictions in the aforesaid method embodiment for a specific workflow of the apparatus embodiment shown in FIG. 4. The workflow is not detailed any more.

To sum up, according to the technical solution disclosed in the apparatus embodiment of the present disclosure, it is possible to determine the relationship evaluation index of two POIs directly according to the user's search operations on the map for POIs without relying on experience, and then judge whether two POIs are in a competitive relationship according to the relationship evaluation index, and thereby improve the accuracy of the processing result. Furthermore, manual operation may not be needed, so that the manpower costs may be saved and the processing efficiency may be improved.

Figure 5:
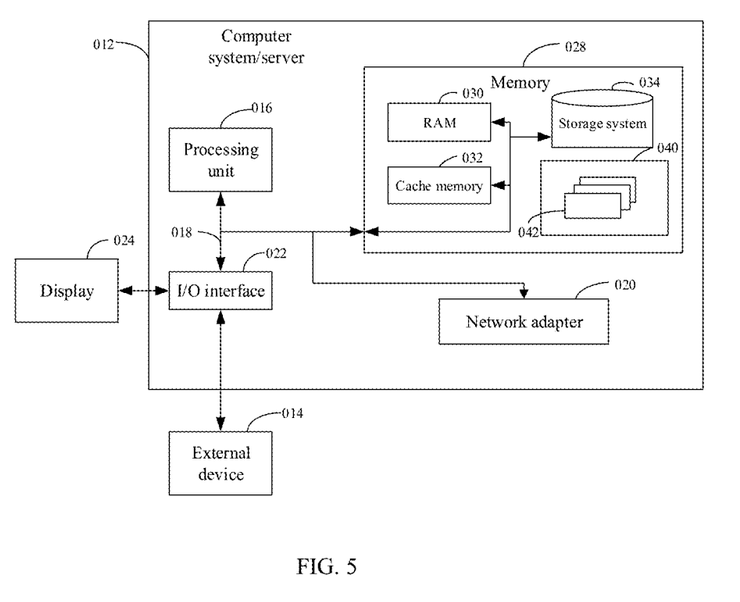
FIG. 5 is a block diagram of a computer system/server 12 adapted to implement an embodiment of the present disclosure.

FIG. 5 illustrates a block diagram of an example computer system/server 12 adapted to implement an implementation mode of the present disclosure. The computer system/server 12 shown in FIG. 5 is only an example and should not bring about any limitation to the function and scope of use of the embodiments of the present disclosure.

As shown in FIG. 5, the computer system/server 12 is shown in the form of a general-purpose computing device. The components of computer system/server 12 may include, but are not limited to, one or more processors (processing units) 16, a memory 28, and a bus 18 that couples various system components including system memory 28 and the processor 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

Memory 28 may include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 may be used for reading from and writing to a non-removable, non-volatile magnetic media (not shown in FIG. 5 and typically called a "hard drive"). Although not shown in FIG. 5, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each drive may be connected to bus 18 by one or more data media interfaces. The memory 28 may include at least one program product having a set (e.g., at least one) of program modules that are configured to carry out the functions of embodiments of the present disclosure.

Program/utility 40, having a set (at least one) of program modules 42, may be stored in the system memory 28, and may include, by way of example and not limitation, an operating system, one or more disclosure programs, other program modules, and program data. Each of these examples or a certain combination thereof may include an implementation of a networking environment. Program modules 42 generally carry out the functions and/or methodologies of embodiments of the present disclosure.

Computer system/server 12 may also communicate with one or more external devices 14 such as a keyboard, a pointing device, a display 24, etc.; with one or more devices that enable a user to interact with computer system/server 12; and/or with any devices (e.g., network card, modem, etc.) that enable computer system/server 12 to communicate with one or more other computing devices. Such communication may occur via Input/Output (I/O) interfaces 22. Still yet, computer system/server 12 may communicate with one or more networks such as a local area network (LAN), a general wide area network (WAN), and/or a public network (e.g., the Internet) via network adapter 20. As depicted in FIG. 5, network adapter 20 communicates with the other communication modules of computer system/server 12 via bus 18. It should be understood that although not shown, other hardware and/or software modules may be used in conjunction with computer system/server 12. Examples, include, but are not limited to: microcode, device drivers, redundant processing units, external disk drive arrays, RAID systems, tape drives, and data archival storage systems, etc.

The processor 16 executes various function applications and data processing by running programs stored in the memory 28, for example, implement the method in the embodiments shown in FIG. 1, FIG. 2 or FIG. 3.

The present disclosure also discloses a computer-readable storage medium on which a computer program is stored, wherein the program, when executed by the processor, implements the method in the embodiment as shown in FIG. 1, FIG. 2 or FIG. 3.

The computer-readable medium in an embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium may include (non exhaustive list) an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. Herein, the computer readable storage medium may be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included on the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments proposed by the present disclosure, it should be understood that the revealed apparatus and method may be implemented in other ways. For example, the above-described embodiments for the apparatus are only exemplary, e.g., the division of the units is merely logical one, and, in reality, they may be divided in other ways upon implementation.

The units described as separate parts may be or may not be physically separated, the parts shown as units may be or may not be physical units, i.e., they may be located in one place, or distributed in a plurality of network units. One may select some or all the units to achieve the purpose of the embodiment according to the actual needs.

Further, in the embodiments of the present disclosure, functional units may be integrated in one processing unit, or they may be separate physical presences; or two or more units may be integrated in one unit. The integrated unit described above may be implemented in the form of hardware, or they may be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A method for mining a point of interest (POI) competitive relationship, comprising:
    for a first POI to be processed, obtaining a set of second POIs serving as mining objects of the first POI; and
    for each second POI in the set, forming a POI pair with the second POI and the first POI, determining a relationship evaluation index of the POI pair according to user's search operations on a map for POIs, and judging whether the two POIs in the POI pair are in a competitive relationship according to the relationship evaluation index,
    wherein the determining the relationship evaluation index of the POI pair comprises:
    counting times of occurrence of a first case in a most recent preset time period, the first case including: a same user sequentially searches for the first POI and the second POI on the map, and a time interval of the two search actions is less than a preset second threshold;
    counting times of occurrence of a second case in a most recent preset time period, the second case including: a same user sequentially searches for the second POI and the first POI on the map, and a time interval of the two search actions is less than the second threshold; and
    taking two counting results as the relationship evaluation index of the POI pair.

2. The method according to claim 1, wherein the obtaining a set of second POIs serving as mining objects of the first POI comprises:
    selecting, according to a predetermined rule, second POIs similar to the first POI from POIs on the map recorded in a database, and obtaining the set of second POIs.

3. The method according to claim 2, wherein the predetermined rule comprises at least one of:
    a second POI belongs to a same category as the first POI; and a distance between a second POI and the first POI is less than a preset first threshold.

4. The method according to claim 1, wherein the judging whether the two POIs in the POI pair are in a competitive relationship according to the relationship evaluation index comprises:

under the condition that the two counting results are both greater than a preset third threshold, determining that the two POIs in the POI pair are in the competitive relationship.

5. The method according to claim 1, wherein the judging whether the two POIs in the POI pair are in a competitive relationship according to the relationship evaluation index comprises:

taking the relationship evaluation index at least as a feature of the POI pair, inputting the feature of the POI pair into a machine learning model obtained by pre-training to obtain a competitive relationship score of the POI pair;

and judging whether the two POIs in the POI pair are in the competitive relationship according to the competitive relationship score.

6. The method according to claim 5, wherein the judging whether the two POIs in the POI pair are in the competitive relationship according to the competitive relationship score comprises:

comparing the competitive relationship score with a preset fourth threshold, and under the condition that the competitive relationship score is greater than the fourth threshold, determining that the two POIs in the POI pair are in the competitive relationship.

7. The method according to claim 5, wherein the judging whether the two POIs in the POI pair are in the competitive relationship according to the competitive relationship score comprises:

after respectively obtaining the competitive relationship scores of the POI pairs in which each second POI in the set of second POIs lies, sorting the competitive relationship scores in a descending order, and under the condition that a competitive relationship score of any POI pair ranks at top K, determining that the two POIs in said any POI pair are in the competitive relationship, K being a positive integer and smaller than the number of the second POIs in the set of second POIs.

8. The method according to claim 5, wherein the training to obtain the machine learning model comprises:

obtaining a POI pair as a positive sample and a POI pair as a negative sample, wherein two POIs in the POI pair as the positive sample are in the competitive relationship, and two POIs in the POI pair as the negative sample are not in the competitive relationship;

obtaining a feature of the POI pair as the positive sample and a feature of the POI pair as the negative sample, the features obtained each at least including a relationship evaluation index; and based on the features obtained, obtaining the machine learning model by training based on the positive sample and the negative sample.

9. A computer device, comprising a memory, a processor and a computer program which is stored on the memory and runs on the processor, wherein the processor, upon executing the program, implements a method for mining a point of interest (POI) competitive relationship, wherein the method comprises:

for a first POI to be processed, obtaining a set of second POIs serving as mining objects of the first POI; and for each second POI in the set, forming a POI pair with the second POI and the first POI, determining a relationship evaluation index of the POI pair according to user's search operations on a map for POIs, and judging whether the two POIs in the POI pair are in a competitive relationship according to the relationship evaluation index, wherein the determining the relationship evaluation index of the POI pair comprises:

counting times of occurrence of a first case in a most recent preset time period, the first case including: a same user sequentially searches for the first POI and the second POI on the map, and a time interval of the two search actions is less than a preset second threshold;

counting times of occurrence of a second case in a most recent preset time period, the second case including: a same user sequentially searches for the second POI and the first POI on the map, and a time interval of the two search actions is less than the second threshold; and taking two counting results as the relationship evaluation index of the POI pair.

10. A non-transitory computer-readable storage medium on which a computer program is stored, wherein the program, when executed by a processor, implements a method for mining a point of interest (POI) competitive relationship, wherein the method comprises:

for a first POI to be processed, obtaining a set of second POIs serving as mining objects of the first POI; and for each second POI in the set, forming a POI pair with the second POI and the first POI, determining a relationship evaluation index of the POI pair according to user's search operations on a map for POIs, and judging whether the two POIs in the POI pair are in a competitive relationship according to the relationship evaluation index, wherein the determining the relationship evaluation index of the POI pair comprises:

counting times of occurrence of a first case in a most recent preset time period, the first case including: a same user sequentially searches for the first POI and the second POI on the map, and a time interval of the two search actions is less than a preset second threshold;

counting times of occurrence of a second case in a most recent preset time period, the second case including: a same user sequentially searches for the second POI and the first POI on the map, and a time interval of the two search actions is less than the second threshold; and taking two counting results as the relationship evaluation index of the POI pair.

* * * * *